US006563233B1

(12) United States Patent
Hinks

(10) Patent No.: US 6,563,233 B1
(45) Date of Patent: May 13, 2003

(54) CONTROL FOR MAIN AND STANDBY POWER SUPPLIES

(75) Inventor: Scott D. Hinks, Newton, NJ (US)

(73) Assignee: Asco Power Technologies, L.P., Florham Park, NJ (US)

( * ) Notice: Subject to any disclaimer, the term of this patent is extended or adjusted under 35 U.S.C. 154(b) by 0 days.

(21) Appl. No.: 09/666,260

(22) Filed: Sep. 21, 2000

(51) Int. Cl.[7] .................................................. H02J 7/00
(52) U.S. Cl. ........................................... 307/64; 307/86
(58) Field of Search ............................... 307/64, 85, 86

(56) References Cited

U.S. PATENT DOCUMENTS

| | | | | |
|---|---|---|---|---|
| 5,895,981 A | * | 4/1999 | Flegel | 307/64 |
| 6,163,449 A | * | 12/2000 | Flegel | 361/601 |
| 6,172,432 B1 | * | 1/2001 | Schnackenberg et al. | 307/23 |
| 6,191,500 B1 | * | 2/2001 | Toy | 307/64 |

OTHER PUBLICATIONS

Kohler Generators Press Releases & Newsletters, Aug. 1999, 3 pages.*
Kohler Power Systems Model G120 Automatic Transfer Switches (product specification) 1998, 2 pages.*
Generac II Pre–Packages Emergency Power Systems (generic product information) no date, 4 pages.*
Generac Power Systems, Inc., (general product information, residential, and power transfer systems, 2000, 6 pages.*
Gen*Tran Power Stay Automatic Power Transfer System, (product information) 3/97, 6 Pages.*
Gen*Tran Home Standby Manual Transfer Switches, (product information) 1999–2000, 4 Pages.*
Gen*Tran On–line Catalog, no date, 7 pages.*
Zenith Control Inc. ZTX Series Automatic Transfer Switch, (porduct information) 1999 6 pages.*
New York State Electric & Gas Corporation, Emergency Generator Safety, May 1999, 8 pages.*
ASCO Series 165 Automatic Transfers Switch, Application Information, May 1999, 9 pages.*
Automatic Transfer Switch Application Guide, G & W Electric Co. Jun. 1998, 8 pages.*
Suggested Specification for Automatic Transfer Switches, ASCO, Apr. 1998, 9 pages.*

\* cited by examiner

*Primary Examiner*—Brian Sircus
*Assistant Examiner*—Sharon Polk
(74) *Attorney, Agent, or Firm*—McDonnell, Boehnen, Hulbert & Berghoff

(57) ABSTRACT

The present invention is a control system for a main power supply and a standby power supply. In response to a utility outage, the control initiates operation of the standby power supply and connects the standby power supply to a standby panelboard, whereby certain branches of the residence are powered.

1 Claim, 1 Drawing Sheet

CONTROL FOR MAIN AND STANDBY POWER SUPPLIES

BACKGROUND OF THE INVENTION

The present invention relates generally to a control for main and standby power supplies and more particularly to a control system for providing standby power, in an outage, to selected branches through a standby panelboard and for allowing additional branches to be powered by the standby power supply through the main panelboard.

Many residences now have a standby power supply, e.g., a gas-powered generator, for use during an outage. Typically, the majority of branches in the residence are connected to a main panelboard. A standby panelboard, powered through the main panelboard under normal conditions, is connected to a selected set of the branches. This branch set represents the more essential branches of the residence, such as those servicing the HVAC system, water pumping/heating system and kitchen appliances.

A control activates the standby power supply upon disruption of the utility service. With nominal operation of the standby power supply, the control interconnects the standby supply to a standby panelboard. As required by the electrical codes, the control also disconnects the standby panelboard from the main panelboard and utility service. Any attempt to power the entire residence with the standby power supply, through the main and standby panelboards, would overload the standby supply.

SUMMARY OF THE INVENTION

In a principal aspect, the present invention is a control system for a main power supply and a standby power supply. With operative utility service, the control provides main power directly to the main panelboard and indirectly to the standby panelboard, through the main panelboard. In response to a utility outage, the control disconnects the standby panelboard from the utility service and initiates operation of the standby power supply. The control connects the standby power supply to a standby panelboard, whereby certain more critical branches of the residence are powered. Additionally, the control couples a feedback branch of the standby panelboard to the main panelboard.

As such, the residence owner has options in managing the standby power. The more essential branches, as defined by the standby panelboard, can alone be serviced by the standby power supply. Other branches may be added via the main panelboard.

It is thus an object of the present invention to provide an improved control system for main and standby power supplies. Another object is a control providing power management options.

These and other features, objects and advantages of the present invention are set forth or apparent in the following detailed description.

BRIEF DESCRIPTION OF THE DRAWING

A preferred embodiment of the present invention is described herein with reference to the drawing herein

DETAILED DESCRIPTION OF A PREFERRED EMBODIMENT

Figure 1:
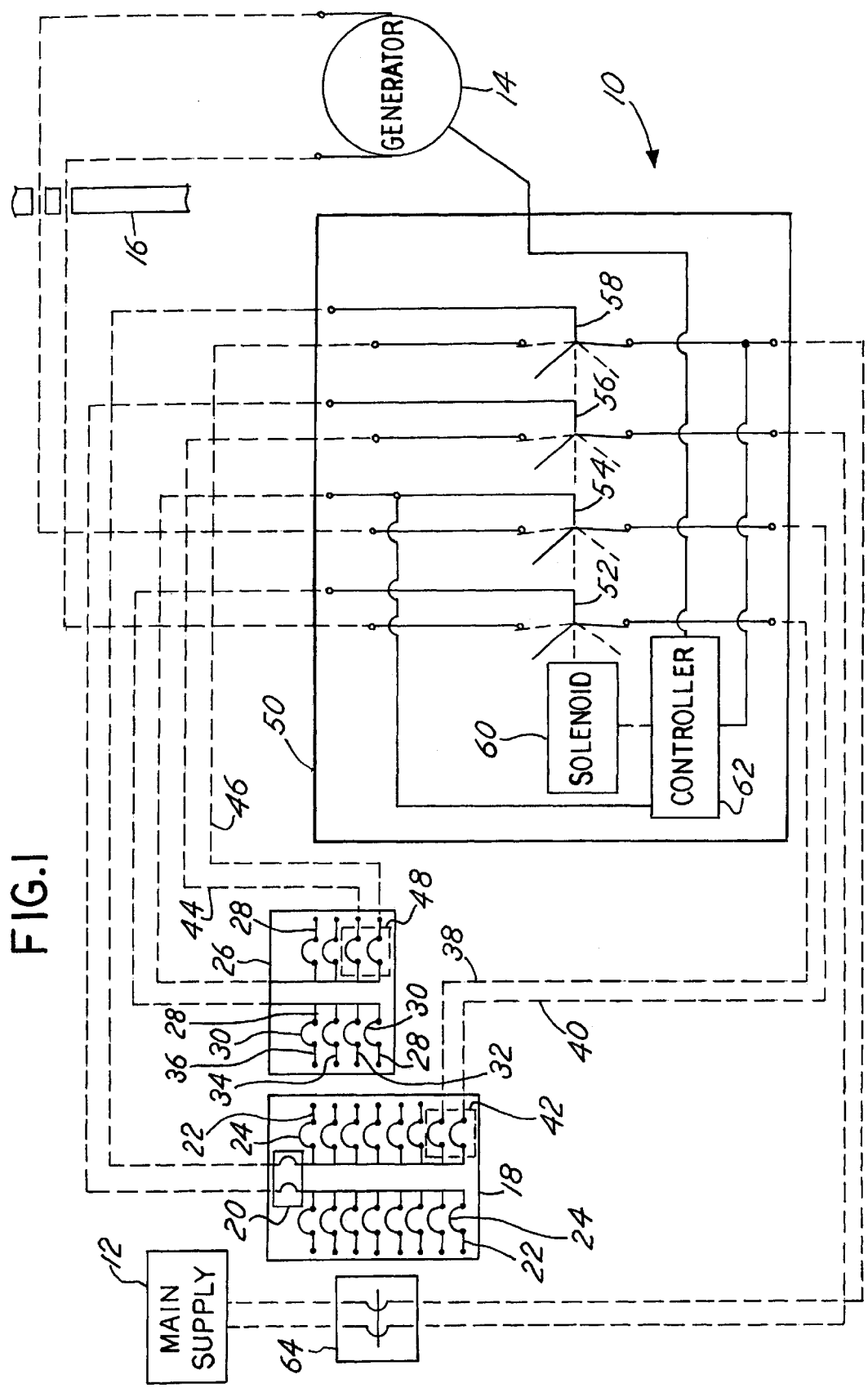
FIG. 1 is an electrical schematic diagram.

The present invention is shown FIG. 1 as a control, generally designated 10, for use with a main, or primary, power supply 12 and a standby, or secondary, power generating source 14, such as gas-powered generator or fuel cell. In this preferred embodiment, the main supply 12 is the conventional electrical utility service, and the standby supply 14 is an outdoor gas-powered generator.

The main power supply 12 has a normal, or operative, state wherein power is supplied to the residence 16. With a disruption, the main supply 12 is in an inoperative state. The standby power supply 14 has an active, or enabled, state for power generation and an inactive, or disabled, state.

The control 10 includes a conventional main panelboard 18, having a main breaker 20 and feeding a series of main branches 22, having associated main branch breakers 24, extending throughout the residence 16. The control 10 further includes a conventional standby panelboard 26, feeding a series of standby branches 28, having standby branch breakers 30. These standby branches 28 represent the more essential systems within the residence 16, such as the HVAC system, water pumping/heating system and kitchen appliances, generally designated 32, 34, 36, respectively.

In this preferred embodiment, the main panelboard 18 has two feeder branches 38, 40, linked to a 2-pole, normally closed manual feeder breaker 42. The standby panelboard 26 has two feedback branches 44, 46 and with a 2-pole, normally open manual feedback breaker 48.

The control 10 also includes a transfer switch 50 responsive to the main power supply 12. The transfer switch 50 includes four double-throw, break-before-make switches 52, 54, 56, 58, respectively, which operate in unison under the control of a solenoid 60. The transfer switch 50 has a controller 62 for monitoring the operational state of the main supply 12 and responsively controlling the standby supply 14 and the solenoid 60. With a disruption, i.e., whenever the main supply 12 is in the inoperative state, the controller 62 initiates operation of the standby supply 14, i.e., starts the generator, and energizes the solenoid 60. The solenoid 60 responsively moves the switches 52, 54, 56, 58 from a first position, shown as solid lines in FIG. 1, to a second position, shown as dotted lines in FIG. 1. When the main supply 12 returns to the operative state, the standby supply 14 is de-activated and the solenoid 60 is energized again, such that the switches 52, 54, 56, 58 are mechanically returned to the first position. The coordinated operation of the solenoid 60 and controller 62 in this preferred embodiment (in contrast to an energized/deenergized operation of a solenoid) is commonly referred to as single solenoid operation.

The transfer switch 50 is commercially available. One suitable switch 50 is marketed by Automatic Switch Company of Florham Park, N.J., under the Product No. 165.

Whenever the main supply 12 is operative, the transfer switch 50 (a) connects the main power supply 12 to the main panelboard 18, (b) disconnects the standby power supply 14 from the standby panelboard 26, (c) couples the feeder branches 38, 40 to the standby panelboard 26, (d) de-couples the feedback branches 44, 46 from the main panelboard 18, and (e) maintains the inactive state of the standby supply 14. Whenever the main supply 12 is inoperative, the transfer switch 50 (a) disconnects the main supply 12 from the main panelboard 18, (b) connects the standby supply 14 to the standby panelboard 26, (c) de-couples the feeder branches 38, 40 from the standby panelboard 26, (d) couples the feedback branches 44, 46 to the main panelboard 18, and (e) maintains the active state of the standby supply 14.

As such, the essential branches 32, 34, 36 are powered by the standby supply 14 during an outage. This represents the "default" operation of the control 10. In addition, the owner of the residence 16 may otherwise manage, or utilize, the standby power through manipulation of the feedback breaker 48 and breakers 24.

For example, the owner may open certain of the conventional breakers 24, residing in the main panelboard 18, and then close breaker 48. The remaining "closed" branches of the main panelboard 18 are now powered by the standby supply 14. Additional branches 22 may be "closed" and thereby powered, so long as the output capacity of the standby supply 14 is not exceeded.

In this preferred embodiment, the control 10 includes a second main breaker 64, interposed to main supply 12 and the transfer switch 50. This additional breaker 64 may be required by the applicable electrical code and offers further protection against interconnection of the main and standby supplies 12, 14, when power is ultimately restored.

A preferred embodiment of the present invention has been described herein. It is to be understood that modifications and changes can be made without departing from the true scope and spirit of the present invention, as defined by the following claims which are to be interpreted in view of the foregoing.

I claim:

1. A control for use with a main power supply, having an operative state and an inoperative state, and a standby power supply, having an active state and an inactive state, comprising, in combination:

a main panelboard feeding to a first group of branches and at least one feeder branch;

a standby panelboard feeding a second group of branches and at least one feedback branch; and a transfer switch responsive to said main power supply;

said transfer switch (a) connecting said main power supply to said main panelboard, (b) disconnecting said standby power supply from said standby panelboard, (c) coupling said feeder branch to said standby panelboard, (d) de-coupling said feedback branch from said main panelboard, and (e) maintaining said inactive state of said standby supply in response to said operative state;

said transfer switch (a) disconnecting said main supply from said main panelboard, (b) connecting said standby supply to said standby panelboard, (c) de-coupling said feeder branch from said standby panelboard, (d) coupling said feedback branch to said main panelboard, and (e) maintaining said active state of said standby supply in response to said inoperative state;

said first group of branches being powered by said main power supply through said transfer switch whenever said main power supply is in said operative state;

said second group of branches being powered by said main power supply through said feeder branch and said transfer switch whenever said main power supply is in said operative state;

said second group of branches being powered by said standby power supply through said transfer switch whenever said main power supply is in said inoperative state;

at least one of said first group of branches being selectively powered by said standby power supply through said feedback branch and said transfer switch whenever said main power supply is in said inoperative state.

* * * * *